(12) United States Patent
Lin

(10) Patent No.: US 9,025,455 B2
(45) Date of Patent: May 5, 2015

(54) PRIORITIZED RANDOM ACCESS METHOD, RESOURCE ALLOCATION METHOD AND COLLISION RESOLUTION METHOD

(75) Inventor: Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 19 days.

(21) Appl. No.: 13/231,920

(22) Filed: Sep. 13, 2011

(65) Prior Publication Data

US 2012/0275305 A1    Nov. 1, 2012

Related U.S. Application Data

(60) Provisional application No. 61/478,948, filed on Apr. 26, 2011.

(51) Int. Cl.
| | |
|---|---|
| *H04W 74/08* | (2009.01) |
| *H04W 72/04* | (2009.01) |
| *H04W 28/04* | (2009.01) |
| *H04W 4/00* | (2009.01) |
| *H04W 74/00* | (2009.01) |

(52) U.S. Cl.
CPC .......... *H04W 74/0841* (2013.01); *H04W 72/04* (2013.01); *H04W 74/004* (2013.01); *H04W 28/042* (2013.01); *H04W 4/005* (2013.01)

(58) Field of Classification Search
USPC .................................. 370/235, 252, 328, 329
See application file for complete search history.

(56) References Cited

U.S. PATENT DOCUMENTS

| | | |
|---|---|---|
| 6,980,561 B1 | 12/2005 | Abi-Nassif |
| 7,027,462 B2 | 4/2006 | Benveniste |
| 7,274,708 B2 | 9/2007 | Benveniste |

(Continued)

FOREIGN PATENT DOCUMENTS

| | | |
|---|---|---|
| CN | 1628436 | 6/2005 |
| CN | 101938844 | 1/2011 |
| TW | 201029386 | 8/2010 |

OTHER PUBLICATIONS

Lien et al., "Toward Ubiquitous Massive Accesses in 3GPP Machine-to-Mechine Communications," IEEE Communications Magazine, Apr. 2011, pp. 66-74.

(Continued)

*Primary Examiner* — Michael Thier
*Assistant Examiner* — Yaotang Wang
(74) *Attorney, Agent, or Firm* — Jianq Chyun IP Office

(57) ABSTRACT

A prioritized random access method, a resource allocation method, and a collision resolution method are proposed for wireless communication devices with different priority levels pre-assigned according to their respective service requirements. In the prioritized random access method, different priorities are assigned to connection requirements of wireless communication devices according to their respective service characteristics. Collision resolution mechanisms of the prioritized random access method enable establishing connections of different service requirements such as time strict, delay tolerant, and normal user service. The resource allocation method allows different types of contention accesses have different collision opportunities and connection setup delays, and also enables dynamical adjustment in resource allocation according to practical application requirements, the number of MTC devices and system loading. Thus, resource utilization rate of the overall wireless communication network is enhanced.

26 Claims, 13 Drawing Sheets

(56) References Cited

U.S. PATENT DOCUMENTS

| | | | |
|---|---|---|---|
| 7,349,422 B2 | 3/2008 | Duong et al. | |
| 7,386,014 B2 | 6/2008 | Flemming et al. | |
| 7,515,574 B2 | 4/2009 | Huang et al. | |
| 7,684,430 B2 | 3/2010 | Gaur et al. | |
| 7,787,487 B2 | 8/2010 | Liu | |
| 7,807,038 B2 | 10/2010 | Ameen et al. | |
| 7,808,941 B2 | 10/2010 | Ramos et al. | |
| 7,817,675 B2 | 10/2010 | Benveniste | |
| 7,843,943 B2 | 11/2010 | Wu et al. | |
| 2004/0071154 A1 | 4/2004 | Wentink | |
| 2004/0233927 A1* | 11/2004 | Hirosawa | 370/445 |
| 2006/0114878 A1 | 6/2006 | Choe et al. | |
| 2007/0032255 A1* | 2/2007 | Koo et al. | 455/512 |
| 2008/0101231 A1 | 5/2008 | Lai et al. | |
| 2009/0323634 A1 | 12/2009 | Kim et al. | |
| 2010/0265907 A1 | 10/2010 | Meier | |
| 2011/0058493 A1* | 3/2011 | Kapadia et al. | 370/252 |
| 2011/0317777 A1* | 12/2011 | Huang et al. | 375/259 |
| 2012/0033613 A1* | 2/2012 | Lin et al. | 370/328 |
| 2013/0034059 A1* | 2/2013 | Lee et al. | 370/328 |

OTHER PUBLICATIONS

Arcia-Moret et al., "A Study of Bandwidth-Perception Management Mechanisms in IEEE 802.16 Networks," Apr. 1, 2010, pp. 1-5.

"Office Action of Taiwan Counterpart Application", issued on Dec. 23, 2013, p. 1-p. 14, in which the listed references were cited.

"Office Action of China Counterpart Application", issued on Jul. 28, 2014, p. 1-p. 7, in which the listed references were cited.

* cited by examiner

PRIORITIZED RANDOM ACCESS METHOD, RESOURCE ALLOCATION METHOD AND COLLISION RESOLUTION METHOD

CROSS-REFERENCE TO RELATED APPLICATION

This application claims the priority benefit of U.S. provisional application Ser. No. 61/478,948, filed Apr. 26, 2011. The entirety of the above-mentioned patent application is hereby incorporated by reference herein and made a part of this specification.

TECHNICAL FIELD

The disclosure generally relates to a prioritized random access method, a resource allocation method, and a collision resolution method for wireless communication devices with different priority levels pre-assigned according to different service requirements.

BACKGROUND

Machine-type-communication communications (abbreviated as MTC, also called Machine to Machine (M2M)) is a capability that enables the implementation of the "Internet of things" (abbreviated as IOT). It is defined as information exchange between a subscriber station (or a wireless communication device) and a server through a wireless communication network or between subscriber stations, which may be carried out without any human interaction. Several industry reports have scoped out huge potential for this MTC market. Given the huge potential, several wireless protocols backward compatible to current wireless communication standards for enabling MTC applications. The characteristics of MTC or JOT are that data is transmitted from MTC devices frequently or infrequently and with low data rate, such that long period operation can be achieved in low cost.

Use case model of MTC communications may include healthcare, secured access & surveillance, public safety, and remote maintenance & control, high priority access is necessary in order to communicate alarms, emergency situations or any other device states that require immediate attention. The future MTC networks can support many services such as industrial JOT, mobile commerce JOT, smart appliances JOT, healthcare JOT, and emergency JOT. Different IOTs or service applications have different service requirements. According to statistics from a wireless communication operator, there may be more than 30,000 MTC devices installed within the radio service coverage of one base station in urban area, or nearly 5,000 MTC device installed in a central urban area, while a normal base station is assumed to serve about 1,000 user equipments (UE).

Further, when a large amount of MTC devices simultaneously request to setup connection with the same base station, it may cause huge burden on the base station. On the other hand, due to the shared wireless medium, the aforementioned connection setup requests form MTC devices may further result in collisions, and after each collision, the MTC devices shall perform respectively random backoff processes for the next connection request transmission. When the collision situation is severe, the connection setup may be failed due to exceeding the pre-configured limit on connection setup request. For example, when the MTC device is required to transmit emergency message (which should be regarded with the highest priority) through the base station, the emergency message may be outdated due to the aforementioned collision and subsequent connection setup failure. Therefore, it is a major issue to design a prioritized random access process suitable for different priority accesses in a wireless communication system.

SUMMARY

A prioritized random access method is introduced herein. According to an exemplary embodiment, the prioritized random access method includes following steps: determining, at the wireless communication device, whether a collision occurs to random access signal transmitted from the wireless communication device according to a signal from a control station; and when the collision occurs to the transmitted random access signal, performing a random access process or a backoff process at least according to a service class of the wireless communication device.

A prioritized random access method is introduced herein. According to an exemplary embodiment, the resource allocation method includes following steps: a determining, at the wireless communication device, whether a collision occurs to random access signal transmitted from the wireless communication device; and when the collision occurs to the transmitted random access signal, performing a backoff process along with another wireless communication device in gapped backoff windows determined according to an indicator from a control station.

A resource allocation method is introduced herein. According to an exemplary embodiment, the resource allocation method is adapted to a control station, and includes following steps: arranging resource allocation for random access process; broadcasting information of the arranged resource allocation for the random access process; determining whether receiving random access signal; determining whether collision occurs in the arranged resource allocation for the random access process when the random access signal is received; and when the collision occurs in the arranged resource allocation for the random access process, transmitting an indicator according to the service classes of wireless communication devices, whose transmitted random access signals results in the collision.

A collision resolution method is introduced herein. According to an exemplary embodiment, the collision resolution method is adapted to a control station, and includes following steps: determining whether collision occurs to configured random access resource; and transmitting an indicator for differentiating backoff processes of wireless communication devices when the collision occurs to the configured random access resource.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EXEMPLARY EMBODIMENTS

Figure 1:
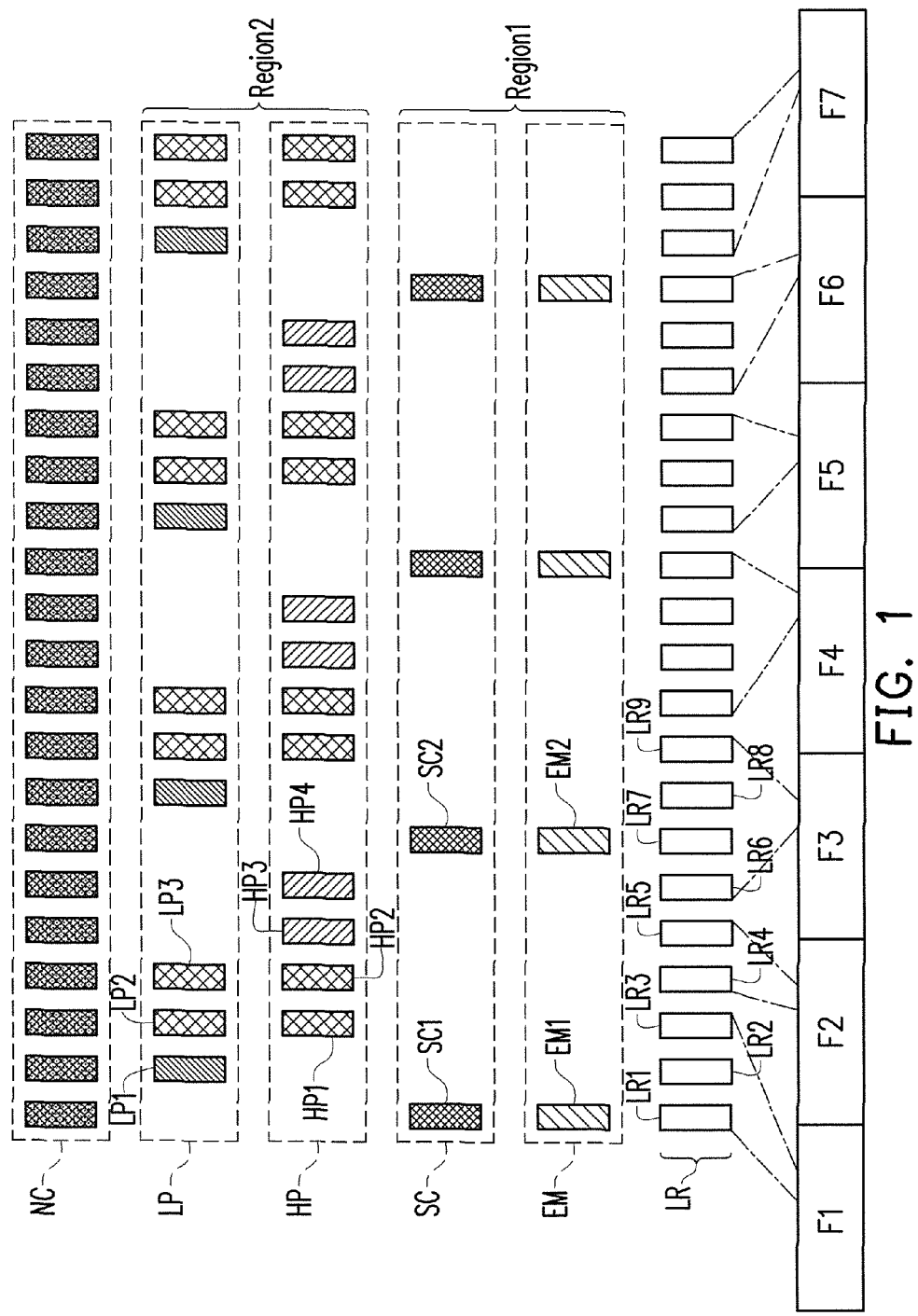
FIG. 1 is a schematic diagram illustrating resource allocation for random access of different service classes according to an exemplary embodiment.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, there are proposed prioritized random access (also known as ranging) methods to satisfy the delay requirements of most Machine-type-communication applications (MTC application, also called the M2M applications). Also, resource allocation methods and collision resolution methods associated with the prioritized random access methods are proposed. Therefore, the conventional random access protocols can be modified for achieving prioritized random access for wireless communication devices with different priority levels pre-assigned according to their respective different service requirements, along with random access collision detection and contention resolution mechanisms.

Throughout the disclosure, a wireless communication device can refer to a user equipment (UE), a mobile station, an advanced mobile station, a wireless terminal communication device, a M2M device, a MTC device, and so fourth. The wireless communication device can be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, an portable healthcare device and so fourth. Also, the base station can refer to an advanced base station, a node B, an enhanced node B (eNB), and so fourth. In addition, a control station can represent any control devices having control capability in the wireless communication network. For example, the control station can represent a base station, a GW, or other stations with control capability.

In the present disclosure, the term "downlink" (DL) refers to the RF signal transmission from a base station to a wireless communication device within the radio coverage of the base station; the term "uplink" (UL) refers to the RF signal transmission from a wireless communication device to its access base station.

The present disclosure proposes a prioritized random access method for supporting prioritized random access of wireless communication devices in wireless communication systems. It is assumed, in the disclosure, that all ranging (random access) attempts are classified into several priority levels in advance, e.g., according to their service requirements. However, the disclosure is not limited thereto. For example, the transmission characteristics can be also possibly applied with request frequency. The proposed prioritized random access method can guarantee that a high priority ranging (random access attempt) should be served earlier than a low priority ranging (random access attempt).

In the present disclosure, the service classification and traffic requirement as shown in Table I below are used. In the present disclosure, services can be classified into Emergency, Scheduled, High Priority, Low Priority and Normal user. The corresponding applications of the Emergency, Scheduled, High Priority, Low Priority and Normal user services could be Public Warning System (PWS), Smart Grid, e-Healthcare, Consumer Electrics, and normal user service setup (e.g., for human-to-human communication). These applications have different service requirements for MTC devices. For example, the PWS is assumed to have the highest priority and strict delay for sending warning and alarms through the wireless communication network; data transmission of the smart grid is periodic and tolerate for some delay, and there may be a large amount of random access requests from MTC devices in the smart grid within a short period of time; the E-health care needs short latency for reporting human status, e.g., blood pressure and heartbeat information; the consumer electronics mostly are applied for ordering products and information exchange and tolerable for some latency; the normal user service has delay impact form MTC devices but might not be acceptable for normal user when the MTC devices greatly influence the normal user's experience so that strict delay is important.

TABLE I

Service classification and traffic requirements

| Services | Application | Requirement | Note |
| --- | --- | --- | --- |
| Emergency | Public Warning System | Extreme short delay | Rare frequency |

TABLE I-continued

Service classification and traffic requirements

| Services | Application | Requirement | Note |
|---|---|---|---|
| Scheduled | Smart Grid | Delay tolerant | Large amount of requests within short period |
| High Priority | E-care, Flee management | Delay tolerant | Regular report |
| Low Priority | Consumer Electronics | Delay tolerant | Infrequent large amount of requests |
| Normal user | Service setup | Strict delay | User experience |

It is noted that it is rare for warning emergency case so that there should not be much resource reserved for the PWS, for which a large amount of resource allocated to the PWS may degrade utilization in the wireless communication network; the amount of MTC devices in the smart grid may introduce massive random access requests; the stable periodicity and data amount for E-health case should be emphasized as well; the amount of MTC transmissions of the consumer electronics may not be predictable; Finally, the impact from other MTC devices upon the normal user service setup case should also be considered.

The present disclosure takes various issues into consideration for various MTC applications and MTC devices such as: how to shorten latency for time strict services; how to prioritize emergency service class among others; how to resolve contention for high priority service and low priority service requests; how to release the burden resulting from a large amount of simultaneous requests; how to provide normal user with specific treatment; how to utilize radio resource for infrequent MTC requests.

In addition to the prioritized random access methods, the present disclosure also proposes resource allocation methods for allocating random access resource for various MTC behaviours and service requirements, and collision resolution methods for contention resolution based on the resource allocation scheme, thereby meeting requirements related to the aforementioned considerations for MTC applications. An exemplary resource allocation is shown in FIG. 1.

FIG. 1 is a schematic diagram illustrating resource allocation for random access of different service classes according to an exemplary embodiment. Referring to FIG. 1, a base station can firstly allocate specific resource based on predefined algorithms in predefined time periods for different MTC services. Here, the resource can be preamble, ranging code, time slot, subcarrier, or other resource that could be used for performing random access process. In the present disclosure, all these resource used for performing random access process are called as "resource unit (RU)". Moreover, the resource can be also a combination of the aforementioned resources, e.g., the combination of preamble and time slot. In addition, the resource units (RUs) can be used as a group of logical resources (LR), and the units in the group of the LRs can be used for random access, including resource allocation or subsequent processing.

For example, referring to FIG. 1, there are a portion of LRs allocated for random access request, such as LR1, LR2, LR3 from a frame F1; LR4, LR5 from a frame F2; LR6, LR7, LR8, LR9 from a frame F3, and other LRs from remaining frames F4, F5, F6, F7, and so fourth. As can be shown in FIG. 1, there are total of 22 LRs from the frames F1-F7 allocated for the random access request. The LRs enclosed in a block with a label of "NC" refers to the LRs allocated to normal user (service class); the LRs enclosed in a block with a label of "LP" refers to the LRs allocated to low priority (service class); the LRs enclosed in a block with a label of "HP" refers to the LRs allocated to high priority (service class); the LRs enclosed in a block with a label of "SC" refers to the LRs allocated to scheduled (service class); the LRs enclosed in a block with a label of "EM" refers to the LRs allocated to emergency (service class).

In the case of FIG. 1, the priority of the high priority service class is greater than that of the low priority service class, and the emergency service class has a highest priority greater than (over) all other service classes, since the emergency service class is a strict delay service class. In contrast, the high priority level, the low priority level, and scheduled priority service class are delay tolerant service classes. The normal user service is an extreme short delay (tolerant) service class.

Referring to FIG. 1, in fact, the LRs allocated to normal user (service class) can occur in any one of the 22 LRs allocated for the random access request. In the present disclosure, the LRs allocated to HP (service class) and the LP (service class) are called Region 2, since these LRs are not scheduled and there are overlapped LRs between the HP (service class) and the LP (service class). On the other hand, the LRs allocated to the SC (service class) and the EM (service class) are called Region 1, since these LRs are shared, and both SC (service class) and the EM (service class) may use the shared LR for an initial random access request.

For some services (or service classes) requesting strict delay, e.g., the emergency service class and the scheduled service class, the wireless communication system or the base station can allocate shared RUs for these service classes. The periodicity of the allocated RUs may be depending on traffic characteristic. For example, the periodicity is 6 for the exemplary case illustrated in FIG. 1. For the example of the Region 1, the amount of RUs allocated to the SC and EM (service classes) can be increased due to the frequency of events and device number (i.e., the number of MTC devices in the SC and EM service classes). The wireless communication system or the base station can allocate more RUs frequently for the service requesting strict delay or a large amount of random access request within a short period, and thus allocate less RUs for the service that are delay tolerate or with small amount of random access requests. If the wireless communication system or the base station expects a large amount of random access requests within some period of time for a particular service class, the allocated RUs can be increased accordingly for the service class.

In normal case, for example, an eNB or a gateway can arrange those RUs periodically for the wireless communication devices for normal usage. The arranged RUs may also be used for paged wireless communication device so that the behaviour could be expected so as to prevent collision with non-paged wireless communication devices. If there are no expected requests, the wireless communication system or the base station can reduce RU allocation for enhancing utilization (or utilization rate of the resource units). The resource can be also used for emergency report so that the emergency request could be transmitted under the condition of zero or low collision probability so as to speed up the random access process for the emergency request.

The wireless communication system or the base station can also allocate another region for random access, as shown in Region 2. In the Region 2, the service requests are classified into high priority and low priority. The high priority services can be allocated with more RUs than the low priority services so that the high priority request can perform random access requests with more random access opportunities and thus complete the random access with shortened count-down delay. The service requests for the low priority services can be allocated with fewer RUs. In the Region 2, the RUs for the requests of the two service classes may have some overlapped RUs and the other non-overlapped RUs. The overlapped part is motivated for increasing utilization and speeding up the backoff count-down; the non-overlapped part is used for separating the random access request of the two service classes, and thus prevents collision between the two service classes. For example, the wireless communication system or the base station can allocate 5 of logical RUs in each physical RUs, in which the high priority service has 4 RUs, while the low priority service has 3 RUs, and there are total 2 of the overlapped RUs between the two service classes. Moreover, the wireless communication system or the base station can allocate more than two parts in Region 2. For example, if there are more than two classes or priorities supported such as medium priority (service class) and very low priority (service class) in addition to the two aforementioned service classes, there can be 3rd part and 4th part allocated in the Region 2.

In the present disclosure, for indicating the allocation of resource for the random access of the MTC devices and the use equipment (UE), the system (e.g., the eNB or the gateway in the wireless communication system) could broadcast system information to the MTC devices and the UEs, or exchange the information with the devices. Each MTC device or UE can accordingly select the RU for random access based on their service classes or priorities in the particular region or RUs. Several contention resolution methods in Region 1, Region 2 and the normal user service setup from UEs are introduced below in accordance with schematic diagrams of FIGS. 2, 3, 4 and 5.

Figure 2:
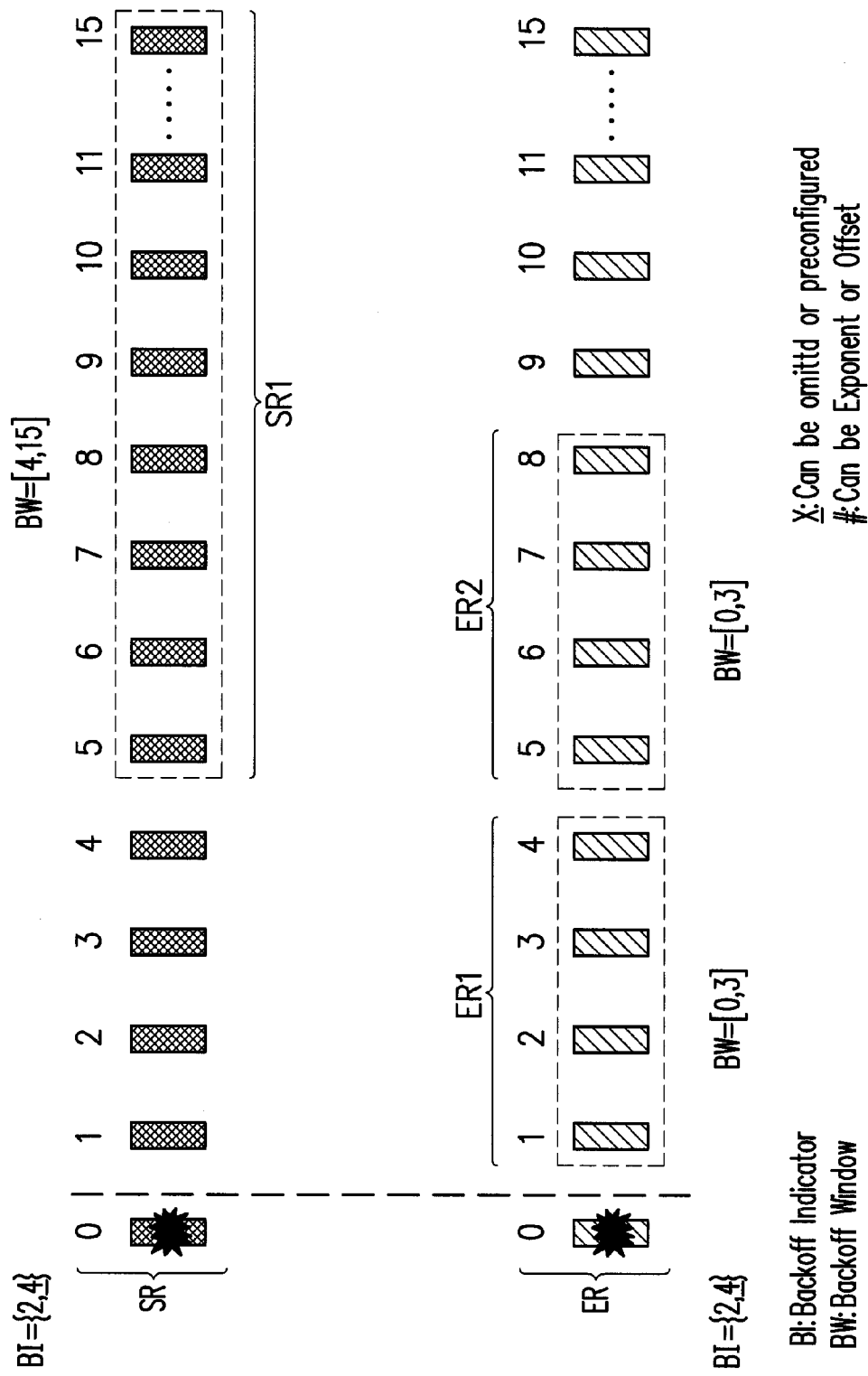
FIG. 2 is a schematic diagram illustrating a contention resolution scheme in Region 1 according to an exemplary embodiment.

FIG. 2 is a schematic diagram illustrating a contention resolution scheme in Region 1 according to an exemplary embodiment. The contention resolution scheme in FIG. 2 can be applied to the resource allocation scheme illustrated in FIG. 1. In FIG. 2, the collision of a scheduled request and emergency request in RU #0 is shown. When the random access requests for the emergency service and the scheduled service are collided in the RU#0, the base station can send a backoff indicator (BI) for indicating occurrence of the collision. In this exemplary case, the base station may not know who or what service classes have collided. However, since the service requests of the Region 2 are not allocated in the RU #0 according to the resource allocation of FIG. 1, the base station can know the collision are not involved with random access requests from the service classes in Region 2.

Referring to FIG. 2, the LRs on the top row corresponding to the label SR refers to the allocated resource for the scheduled request; the LRs on the bottom row corresponding to the label ER refers to the allocated resource for the emergency request. Two parameters could be included in the BI message, e.g., {2, 4}. The first parameter is used for the emergency service to generating an offset window. In the present disclosure, the offset window includes a backoff window. For example, the first parameter indicates the backoff windows for a first service class is between $2^0$ and $2^2-1$, i.e., between 0 and 3. That is, the backoff window indicated by the label ER1 or the label ER2. The MTC device in the Region 1 can select a random number in the backoff window for backoff count-down. The second parameter, e.g., 4, is used for indicating the backoff window of the other service. For example, the second parameter in the BI message {2, 4} is used to tell the backoff window of a second service class between $2^2$ and $2^4-1$, i.e., between 4 and 15. That is the backoff window indicated by the label SR1. Therefore, the backoff windows for the emergency service class and the scheduled service class are separated by the BI message. In other words, the MTC devices of the service classes in the Region 1 respectively perform backoff processes in gapped windows determined according to the received BI message.

In FIG. 2, the second parameter is underlined, which indicates the number can be omitted or preconfigured in this exemplary case, while the first parameter can be an exponent or an offset depending upon system information broadcast from the wireless communication system or the base station. The MTC devices belonging to the scheduled service class can select a random number in the backoff window for backoff count-down. The contention resolution scheme illustrated in FIG. 2 provides a contention resolution method for the two service classes to select different backoff windows for counting down so that another collision could be avoided. This feature also forces the MTC devices belonging to the emergency service class select a smaller random number for backoff and start counting down earlier so that short delay could be provided. On the other hand, the feature forces the MTC devices belonging to the scheduled service class select a larger random number for backoff and start counting down in another backoff window later than the backoff window of the emergency service class, so that longer delay is provided to the scheduled service class. In other words, the gapped windows are used by different service classes in Region 1 such that the emergency service class and the scheduled service class retry random access request in different resources (RUs or LUs).

When the collision has occurred previously, the scheduled service may select a number in doubled window from the indication in BI, e.g., {2, 5}. The increasing of backoff window may also help to increase the access successful rate by separating backoff RUs in random access process. Therefore, the emergency service class and the scheduled service class retry random access request in different resources (RUs or LUs).

Figure 3:
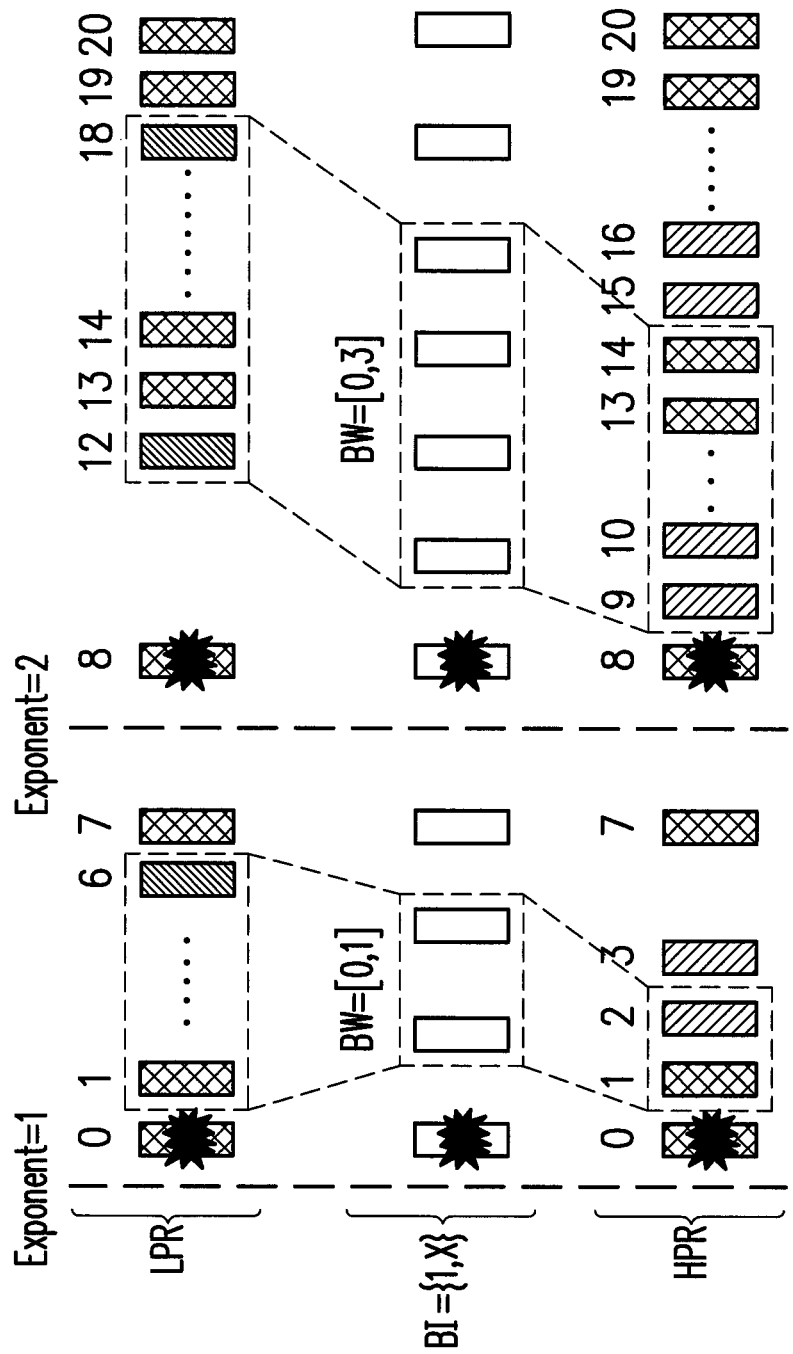
FIG. 3 is a schematic diagram illustrating a contention resolution scheme in Region 2 according to an exemplary embodiment.

FIG. 3 is a schematic diagram illustrating a contention resolution scheme in Region 2 according to an exemplary embodiment. In this contention resolution method illustrated in FIG. 3, the service classes of high priority and low priority process random access in the Region 2 based on the BI message transmitted by the eNB or the gateway (GW). The RUs on the top row corresponding to the label LPR refers to the allocated resource for the low priority service request; the RUs on the bottom row corresponding to the label SR refers to the allocated resource for the emergency request. The LRs on the middle row are corresponding to the backoff window such as the backoff windows BW=[0,1] and BW=[0,3]. With the same process, the MTC devices of the Region 2 select a random number in the same backoff window.

For example, the backoff window is [0,1], when "1" is indicated in the BI message. However, the two kinds of random access requests may be continued in different RUs since there is slight difference in resource allocations for the high priority service class and low priority service class. To be illustrated more clearly, the low priority request may continue random process in logical RU #1 and logical RU #6, while the high priority request may continue the process in logical RU #1 and logical RU #2 by the resource allocation. It is known that the two backoff processes may be continued in overlapped and non-overlapped parts of RUs even when the same backoff count-down (or the backoff parameter) is selected. In other words, the MTC devices of the service class in the Region 2 respectively perform backoff processes in gapped windows determined according to the received BI message. As a result, the collision probability can be reduced by the RU allocation for the two service classes. If the collision still happens in the overlapped RUs (such as collided in the logical RU #8), the backoff windows can be doubled and the two kinds of random access requests can still have chance to count down in different parts of RUs, e.g., the RUs indicated by {12, 13, 14, 18} on the top row for the low priority request, and the URs indicated by {9, 10, 13, 14} on the bottom row for high priority request. From the aspect of timeline, since the high priority request is allocated with earlier RUs for counting down, the random access delay for the high priority request can be shortened than that of the requests of the other kind service class(es).

Figure 4:
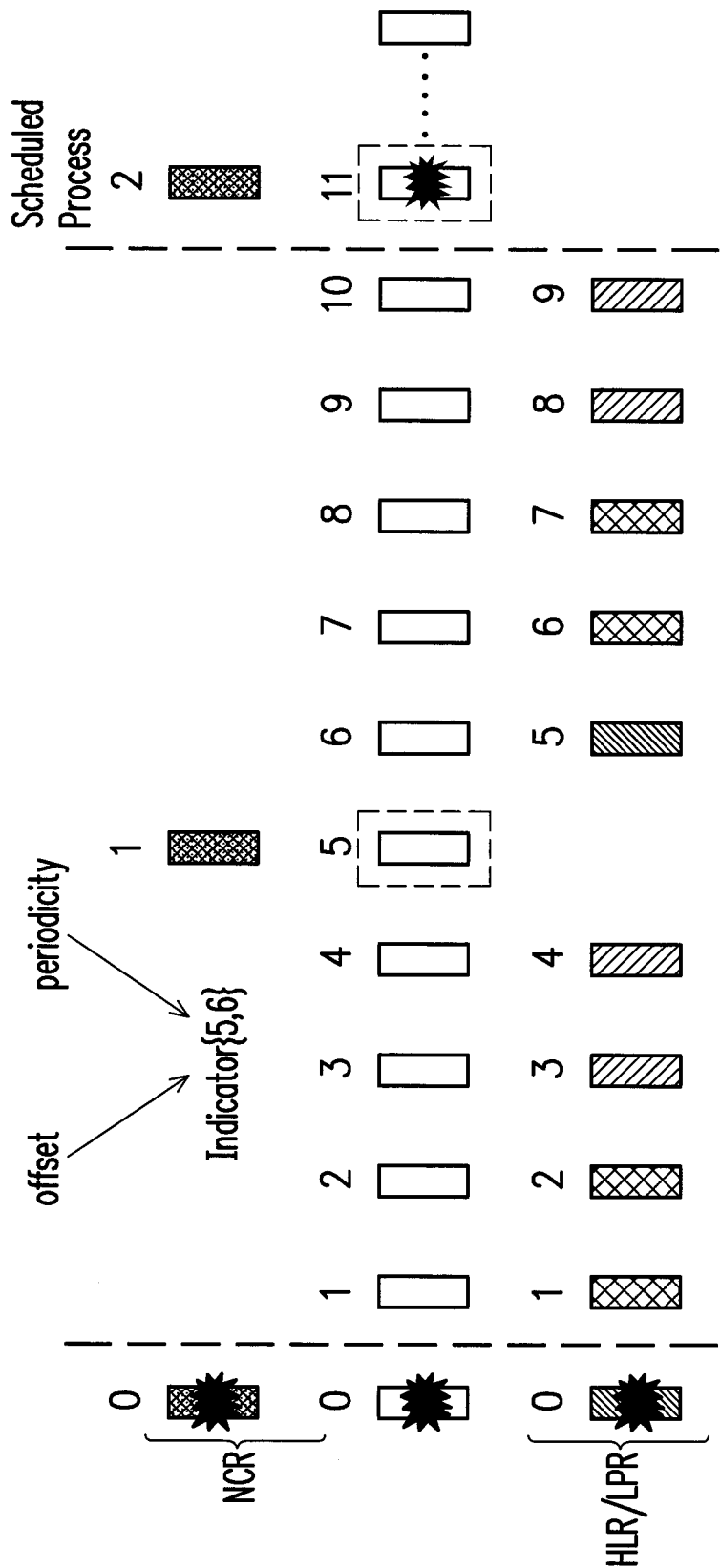
FIG. 4 is a schematic diagram illustrating a contention resolution scheme for a normal call setup according to an exemplary embodiment.

The third proposed contention resolution method is for the normal user service setup (for example, the normal user service setup for the human-to-human communication). The normal user service setup cases could be generally divided into two situations. FIG. 4 is a schematic diagram illustrating a contention resolution scheme for a normal user service setup according to an exemplary embodiment. Since the normal user service setup such as the LRs enclosed by a block indicated by the label NC in FIG. 1 can occur in any LRs, the random access request of the normal user service setup can easily collide with the random access requests of other service classes. In FIG. 4, the RUs on the top row corresponding to the label NCR refers to the allocated resource for the normal user service request; the RUs on the bottom row corresponding to the label HLR/LPR refers to the allocated resource for the high priority request/low priority request. In the case of FIG. 4, the random access request of the normal UE collides with the random access request of the high priority request/low priority request in RU#0. In this contention resolution scheme, the eNB or the gateway may send out another indicator (different from the BI message) when the random access request from a normal UE (or a user device) collides with the random access request of the high priority class or the low priority class in the Region 2. The indicator shown in FIG. 4 includes two types of parameters: offset and periodicity.

Referring to FIG. 4, the offset is used to tell the normal UE to delay for a predefined period of time (or predefined number of RUs) to restart (or continue) the random access process, while the periodicity indicate the frequency of the RU allocation for the random access. To be illustrated more clearly, the indicator is used to tell (or direct) the normal UE to execute the random access process in the Region 1. When the normal UE has already known the RU allocation, the indicator (message) could be omitted or the device could skip the reception.

In the example illustrated in FIG. 4, the indicator, {5, 6}, represents that there will be RU resources allocated every 6 RUs after 5 RUs is passed. The normal UE can use the RU in the Region 1 to complete the random access process without continuing colliding with those requests of the high priority service class/low priority service class in the Region 2. For example, the normal UE can firstly use the RU #5 for retrying random access request. For another example, since the periodicity is 6, the next random access request of the normal UE may occur in RU #11, and may be collided with random access process from service classes in the Region 1. In other words, the UE retries the random access processes along with another wireless communication device in different resources determined according to the received indicator. As a result, the random access for the normal UE will not be impacted by the massive amount of the high priority/low priority MTC devices. It is noted that the emergency service request could still obtain higher priority than the normal UE service request in the Region 1. Another contention resolution scheme involved with a normal user service setup process is illustrated in FIG. 5.

Figure 5:
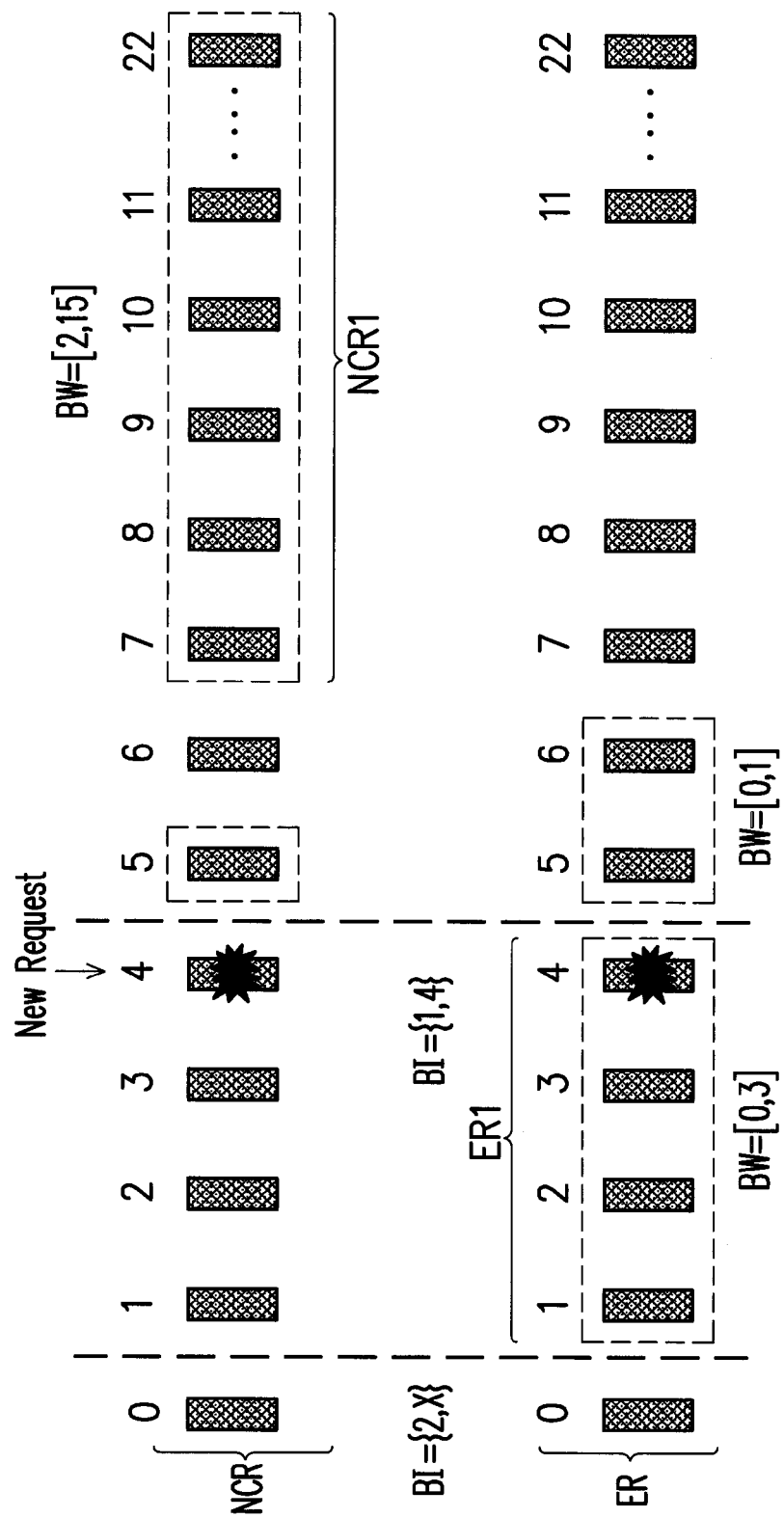
FIG. 5 is a schematic diagram illustrating another contention resolution scheme for a normal call setup according to an exemplary embodiment.

FIG. 5 is a schematic diagram illustrating another contention resolution scheme for a normal user service setup according to an exemplary embodiment. In FIG. 5, the RUs on the top row corresponding to the label NCR refers to the allocated resource for the normal user service request; the RUs on the bottom row corresponding to the label ER refers to the allocated resource for the emergency service request. In the case of FIG. 5, the random access request from the normal UE can use the same random access process as those from the scheduled MTC devices.

For example, the MTC device of the emergency service class initially receives a first BI message with a parameter set of {2, X}, where the parameter X is a preconfigured parameter, and thus the backoff window of the emergency service class is BW=[0,3] (enclosed by dashed block indicating by the label ER1), and the random access request of the normal UE collides with the random access request of the emergency service request in RU #4. In this contention resolution scheme, the eNB or the gateway may send out a second BI message (BI={1,4}) when the random access request from a normal UE collides with the random access request of the service class in the Region 1. When the collision happens in this Region 1, the normal UE receives the second BI message, and use the second BI message to generate a random backoff number by referring to the parameters in BI message in the part of RUs that emergency would not select. To be illustrated more clearly, after the collision, the MTC device of the emergency service class uses another backoff window of BW=[0, 1] (enclosed by dashed block indicating by the label ER2) by selecting the first parameter in the second BI message, while the normal UE uses a backoff window of BW=[2,15] (enclosed by dashed block indicating by the label NCR) by selecting the second parameter in the second BI message. Thus, the backoff windows of the NCR and the ER are separated by this contention resolution scheme.

Figure 6B:
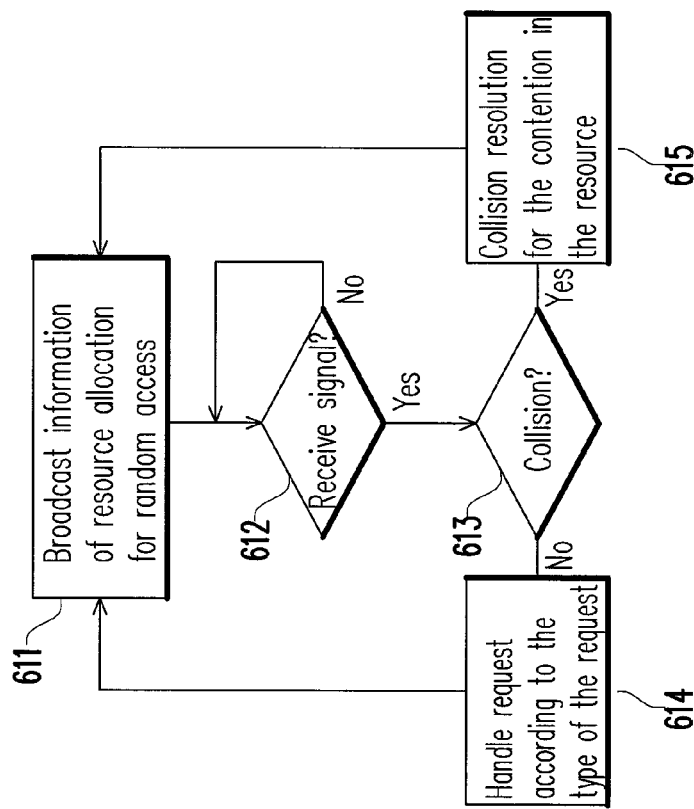
FIG. 6B is a flowchart illustrating a collision handling method according to an exemplary embodiment.
Figure 6A:
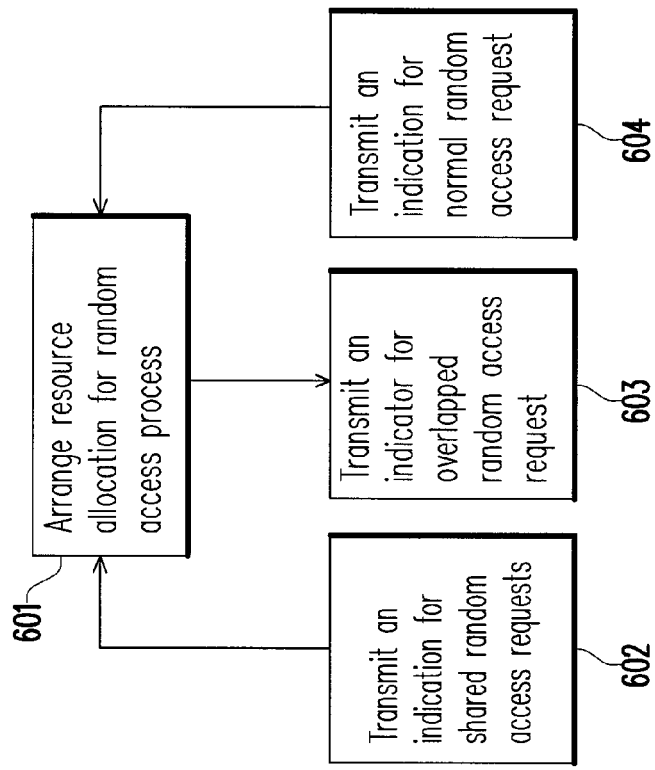
FIG. 6A is a flowchart illustrating a resource allocation method according to an exemplary embodiment.

FIGS. 6A, 6B, 6C, 6D respectively disclose the eNB/GW process for the concept in the aforementioned disclosure. For the simplicity of illustration, the base station is used in those figures for representing the control station. FIG. 6A is a flowchart illustrating a resource allocation method according to an exemplary embodiment. Referring to FIG. 6A, the resource allocation method is adapted to a control station or a wireless communication system, which starts from step 601. In step 601, the base station arranges resource allocation for random access process, such as the resource allocation scheme illustrated in FIGS. 1, 8 and 9. In step 602, the base station transmits an indication for random access requests in the Region 1 (shared LRs) such as in the contention resolution case for service classes in the Region 1 illustrated in FIG. 2. In step 603, the base station transmits an indication for the random access requests in Region 2 (overlapped LRs) such as in the contention resolution case for service classes in the Region 2 illustrated in FIG. 3. In step 604, the base station transmits an indication for the normal user random access requests such as in the contention resolution case for the normal user random access request colliding with other service classes illustrated in FIGS. 4 and 5.

In fact, between the step 601 and other steps 602-604, the base station also needs to determine whether receiving any random access signal in the allocated RU preconfigured for random access signal, as well as detecting whether collision occurs after it is confirmed random access request is received. Moreover, the base station further determines to execute the step 602, the step 603, and the step 604 according to the type of collision. The type of collision refers to determining the service classes, from which the random access requests are collided. For example, the base station or the wireless communication system can continuously analyze random access behaviours of the normal user random access requests, and thus identify the normal user service setup random access request according to arrival rate statistics of the normal user random access requests. Also, the RU allocation scheme for the Region 1 and the Region 2 are distinct, so the base station can easily determine the type of collisions.

FIG. 6B is a flowchart illustrating a collision handling method according to an exemplary embodiment. FIG. 6B provides a detailed illustration of FIG. 6A in terms of resource allocation information delivery, random access request signal detection, collision detection and subsequent processing. Also, FIG. 6B provides more technical disclosure of resource allocation information delivery after the step 601 in FIG. 6A, random access request signal detection and collision detection after the step 601, but before the steps 602, 603 or 604.

Referring to FIG. 6B, in step 611, the base station can broadcast information of resource allocation for random access requests. In step 612, the base station determines whether receiving signal (for the random access request). For example, the signal can be preamble or ranging code. In step 613, the base station determines whether collision occurs in the allocated RU (preconfigured for random access request). For another example, when the base station cannot successfully decode the preamble or the signal in the allocated RU preconfigured for the random access request, the base station can determine that the collision occurs.

In the step 613, when the determination result is yes, after the step 613, step 615 is executed; when the determination result is No, after the step 613, step 614 is executed. In step 614, the base station continues to handle the random access request according to the type of the random access request. The handling may include replying random access response and allocating uplink bandwidth for subsequent uplink transmission, and so fourth. After the step 614, it is returned to the step 611. In the step 615, the base station executes collision resolution for the contention in the allocated resource for the random access requests.

Figure 6D:
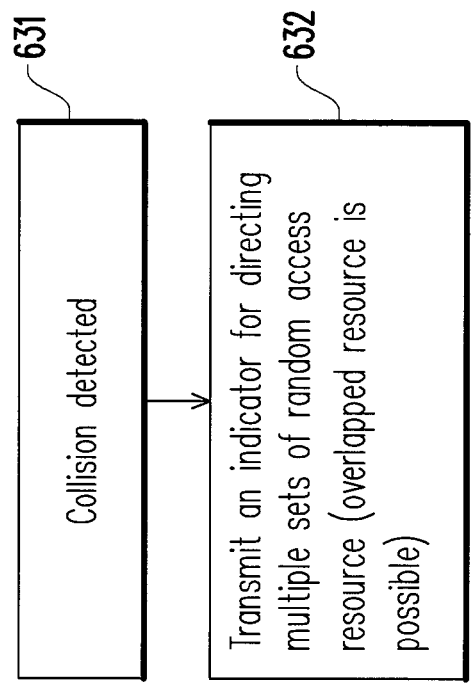
FIG. 6D is a flowchart illustrating a collision resolution method for non-overlapped resource according to an exemplary embodiment.
Figure 6C:
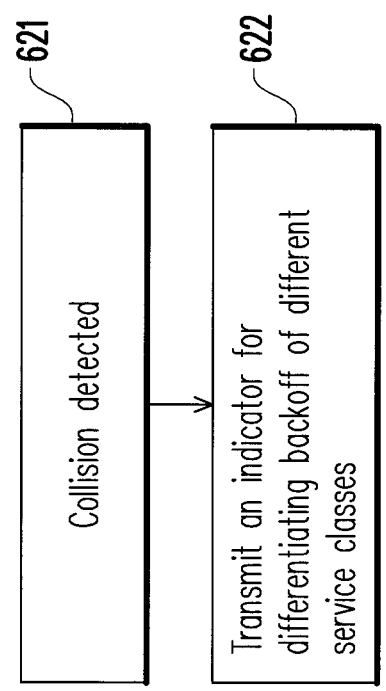
FIG. 6C is a flowchart illustrating a collision resolution method for overlapped resource according to an exemplary embodiment.

FIG. 6C is a flowchart illustrating a collision resolution method for overlapped resource according to an exemplary embodiment. FIG. 6C provides a detailed illustration of the steps 613 and 615 in FIG. 6B in terms of contention resolution. In step 621, the base station detects collision occurs in the allocated RU preconfigured for random access requests. In step 622, the base station can transmit an indicator for differentiating backoff processes of different service classes, such as the contention resolution scheme illustrated in FIGS. 2 and 5.

FIG. 6D is a flowchart illustrating a collision resolution method for non-overlapped resource according to an exemplary embodiment. FIG. 6D provides a detailed illustration of the steps 613 and 615 in FIG. 6B in terms of contention resolution. Step 631 is similar to the step 621 so detailed technical disclosure can be referred to the step 621. In step 632, the base station can transmit an indicator for directing multiple sets of random access resources (overlapped resource may be possible). The multiple sets of random access resources are initially preconfigured for different service classes, and the indicator transmitted in the step 632 provides a direction for one service class such as the contention resolution scheme illustrated in FIGS. 3, 4.

Figure 7B:
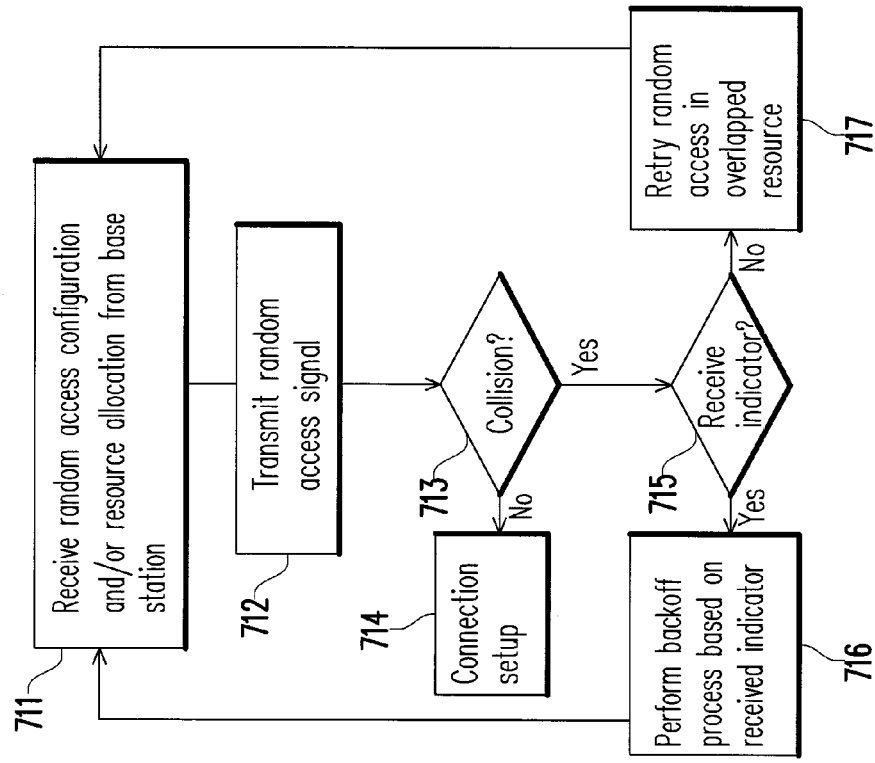
FIG. 7B is a flowchart illustrating a random access method for high priority level/low priority level service class according to an exemplary embodiment.
Figure 7A:
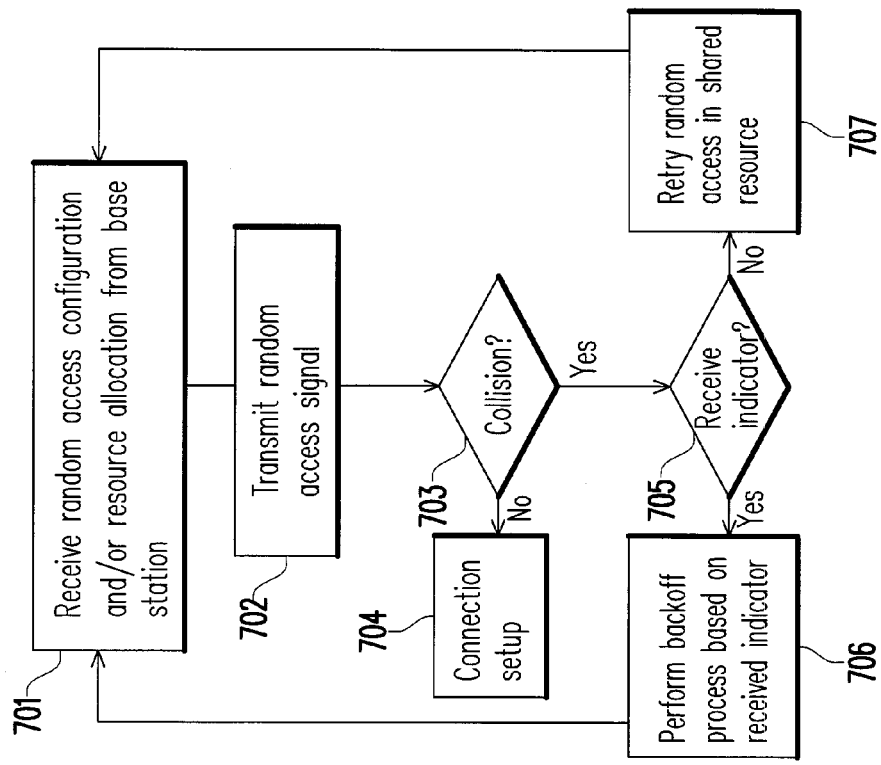
FIG. 7A is a flowchart illustrating a random access method for emergency service class according to an exemplary embodiment.
Figures 7C, 7D:
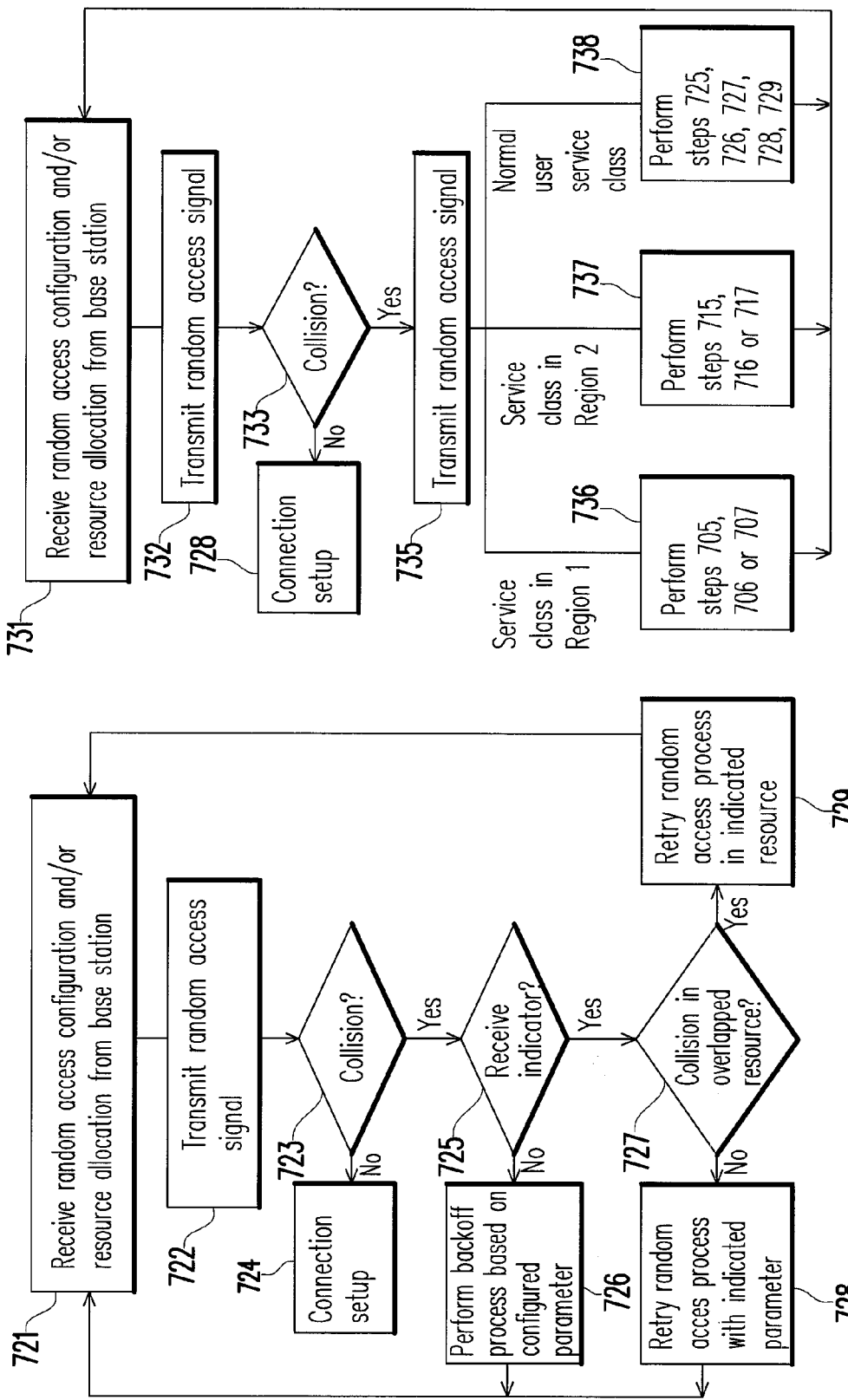
FIG. 7C is a flowchart illustrating a random access method for normal user service class according to an exemplary embodiment.
FIG. 7D is flowchart illustrating a generalized random access method according to an exemplary embodiment.

FIGS. 7A, 7B, 7C respectively discloses the MTC device/UE process for the concept in the aforementioned disclosure. For the simplicity of illustration, the base station is used in those figures for representing the control station. FIG. 7A is a flowchart illustrating a random access method for emergency service class according to an exemplary embodiment. Referring to FIG. 7A, the random access method is a prioritized random access method, which starts from step 701. In the step 701, an MTC device of the emergency service class receives random access configuration and/or resource allocation (such as the RU allocation illustrated in FIGS. 1, 8, 9) from a base station. In the step 702, the MTC device of the emergency service class transmits random access signal. It is noted that the random access signal for the emergency service can occur in shared resource(s). In step 703, the MTC device of the emergency service class determines whether a collision occurs. For example, the MTC device determines that the collision occurs to the transmitted random access signal since the MTC device receive no random access response from the base station within a predefined period of time. In the step 703, when the determination result is yes, after the step 703, step 705 is executed; when the determination result is No, after the step 703, step 704 is executed.

In the step 704, the MTC device of the emergency service class completes the connection setup. In the step 705, the MTC device further determines whether receiving an indicator from the base station or the wireless communication system. In the step 705, when the determination result is yes, after the step 705, step 706 is executed; when the determination result is No, after the step 705, step 707 is executed. In the step 706, the MTC device of the emergency service class performs backoff process based on the received indicator. After the step 706, it is returned to the step 701. In the step 707, the MTC device of the emergency service class retries random access in shared resource. In other words, the MTC device of the emergency service class re-transmits the random access signal in the LRs in Region 1. After the step 707, it is returned to the step 701.

FIG. 7B is a flowchart illustrating a random access method for high priority level/low priority level service class according to an exemplary embodiment. In fact, step 711 to step 716 are similar to the step 701 to the step 706 except that MTC devices of the high priority level/low priority level service class transmit random access signals in the allocated resource in the step 713. The technical disclosure of the step 711 to the step 716 can be referred to the step 701 to the step 706. In step 717, the MTC devices of the high priority level/low priority level service class retries random access in a preconfigured set of resources, where the preconfigured set of resources include non-overlapped resource for the high priority level service class. In other words, the MTC device re-transmits the random access signal in the preconfigured resource for the set of service classes in the Region 2. After the step 717, it is returned to the step 711.

FIG. 7C is a flowchart illustrating a random access method for normal user service class according to an exemplary embodiment. In fact, step 721 to step 725 are similar to the step 701 to the step 705 except that UE of the normal user service class can transmit random access signal in any logical RU in the step 713. The technical disclosure of the step 721 to the step 725 can be referred to the step 701 to the step 705. In step 725, when the determination result is No, after the step 725, step 726 is executed; when the determination result is yes, after the step 725, step 727 is executed. In the step 726, the UE of the normal user service class performs backoff process based on the configured parameter. For example, the configured parameter can be broadcasted from the base station in advance. After the step 726, it is returned to the step 721.

In the step 727, the UE continues to determine whether collision occurs (to the transmitted random access signal) in the resource in Region 2. In step 727, when the determination result is No, after the step 727, step 728 is executed; when the determination result is yes, after the step 727, step 729 is executed. In the step 728, the UE retries random access process with indicated parameter according to the indicator received in the step 725. After the step 728, it is returned to the step 721. In the step 729, the UE retries random access process in indicated resource according to the indicator received in the step 725. After the step 729, it is returned to the step 721.

FIG. 7D is a flowchart illustrating a generalized random access method according to an exemplary embodiment. The present embodiment provides a prioritized random access method for wireless communication devices of different service classes including the aforementioned service classes. In the step 731, a wireless communication device receives random access configuration and/or resource allocation from a base station. In the step 732, wireless communication device transmits random access signal. In step 733, the wireless communication device determines whether a collision occurs. In the step 733, when the determination result is yes, after the step 733, step 735 is executed; when the determination result is No, after the step 733, step 734 is executed. In the step 734, the wireless communication device completes the connection setup.

In the step 735, the wireless communication device further determines its service class. In the step 735, when the wireless communication device is a MTC device of a service class in the Region 1, after the step 735, step 736 is executed; when the wireless communication device is a MTC device of a service class in the Region 2, after the step 735, step 737 is executed; when the wireless communication device is a UE of a normal user service class, after the step 735, step 738 is executed. In other words, when the collision occurs to the transmitted random access signal in the step 733, the wireless communication device performs the random access process or the backoff process at least according to the determination result of collision, the service class of the wireless communication device, and a determination result on whether receiving an indicator.

In the step 736, the wireless communication device continues performing procedures described in the steps 705, 706 or 707 of FIG. 7A. In the step 737, the wireless communication device continues performing procedures described in the steps 715, 716 or 717. In the step 738, the wireless communication device continues performing procedures described in the steps 725, 726, 727, 728 or 729. After the steps 736, 737 or 738, it is returned to the step 731.

Figure 8:
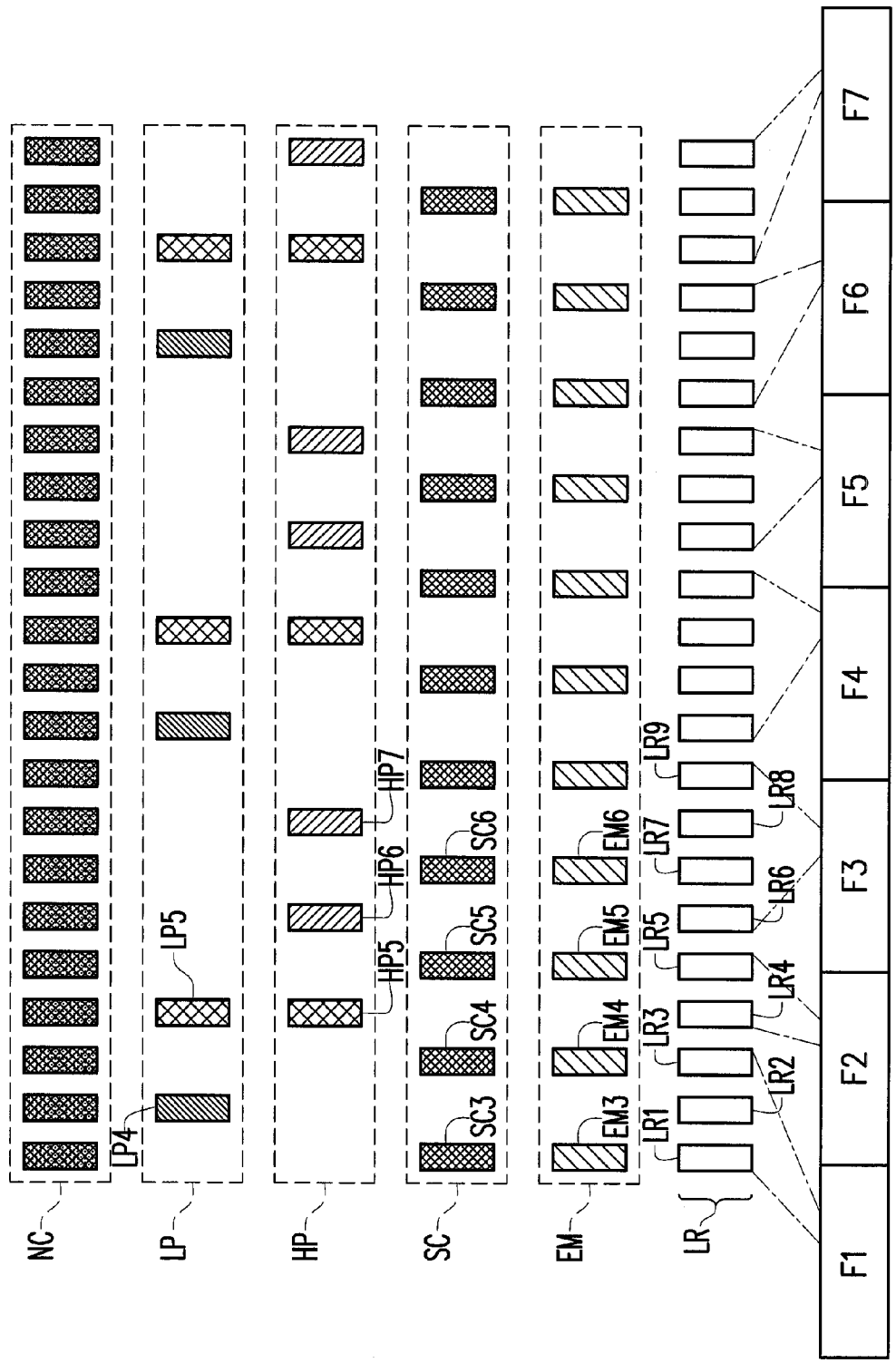
FIG. 8 is a schematic diagram illustrating resource allocation for random access of different service classes in a high danger scenario according to an exemplary embodiment.

FIG. 8 is a schematic diagram illustrating resource allocation for random access of different service classes in a high danger scenario according to an exemplary embodiment. It is assumed more emergency service events may occur in the area corresponding to the case illustrated in FIG. 8. By allocating more RUs in the Region 1, the related MTC devices (in the Region 1) can complete the random access with short delay and high successful rate. For example, in the scenario of FIG. 1, within a periodicity of 6, there are three RUs (indicated as LP1, LP2, LP3) allocated to the low priority service class, four RUs (indicated as HP1, HP2, HP3, HP4) allocated to the high priority service class, and one shared RU (e.g., EM1) allocated for the Region 1. In the RU allocation scheme in FIG. 8, within a periodicity of 8, there are two RUs (indicated as LP4, LP5) allocated to the low priority service class, three RUs (indicated as HP5, HP6, HP7) allocated to the high priority service class, and four shared RUs (indicated as EM3, EM4, EM5, EM6 or SC3, SC4, SC5, SC6) allocated for the Region 1. It is noted the RUs allocated in the Region 2 can be allocated separately. In the case of FIG. 8, the collision probability in the Region 2 may be increased due to less RU allocations, but the random access in the Region 1 is not impacted.

Figure 9:
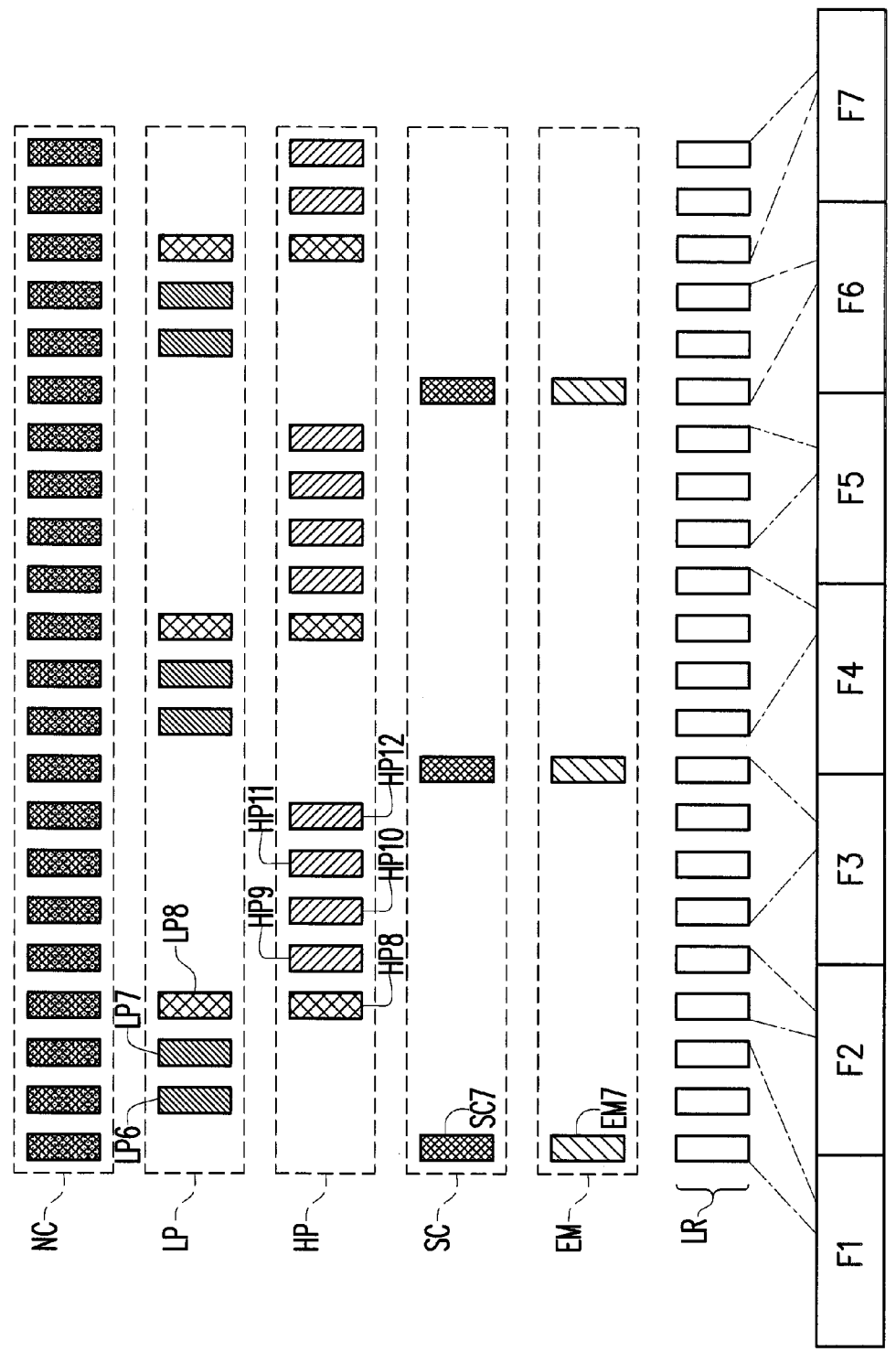
FIG. 9 is a schematic diagram illustrating resource allocation for random access of different service classes in a mass device scenario according to an exemplary embodiment.

FIG. 9 is a schematic diagram illustrating resource allocation for random access of different service classes in a mass device scenario according to an exemplary embodiment. It is assumed the mass device scenario can occur in densely populated area or central urban area, in which the service requests of the Region 2 may occur more frequently in such area corresponding to the case illustrated in FIG. 9. By allocating more RUs in the Region 2, the massive MTC devices in the Region 2 could have more resource for random access and backoff count-down. For example, compared with the scenario in FIG. 1, within a periodicity of 8 in the case of FIG. 9, there are three RUs (indicated as LP6, LP7, LP8) allocated to the low priority service class, five RUs (indicated as HP8, HP9, HP10, HP11, HP12) allocated to the high priority service class, and one shared RU (e.g., SC7 or EM7) allocated for the Region 1. In the case of FIG. 9, the performance for the service classes in the Region 2 can be improved. However, the periodically allocated RU resource in the Region 1 could be maintained for handling the scheduled and emergency service requests, or prioritize other service requests. Since logical resource preconfigured for region 2 is increased, success probability in contention is thereby increased, which can be regarded as enhanced priority.

Figure 10:
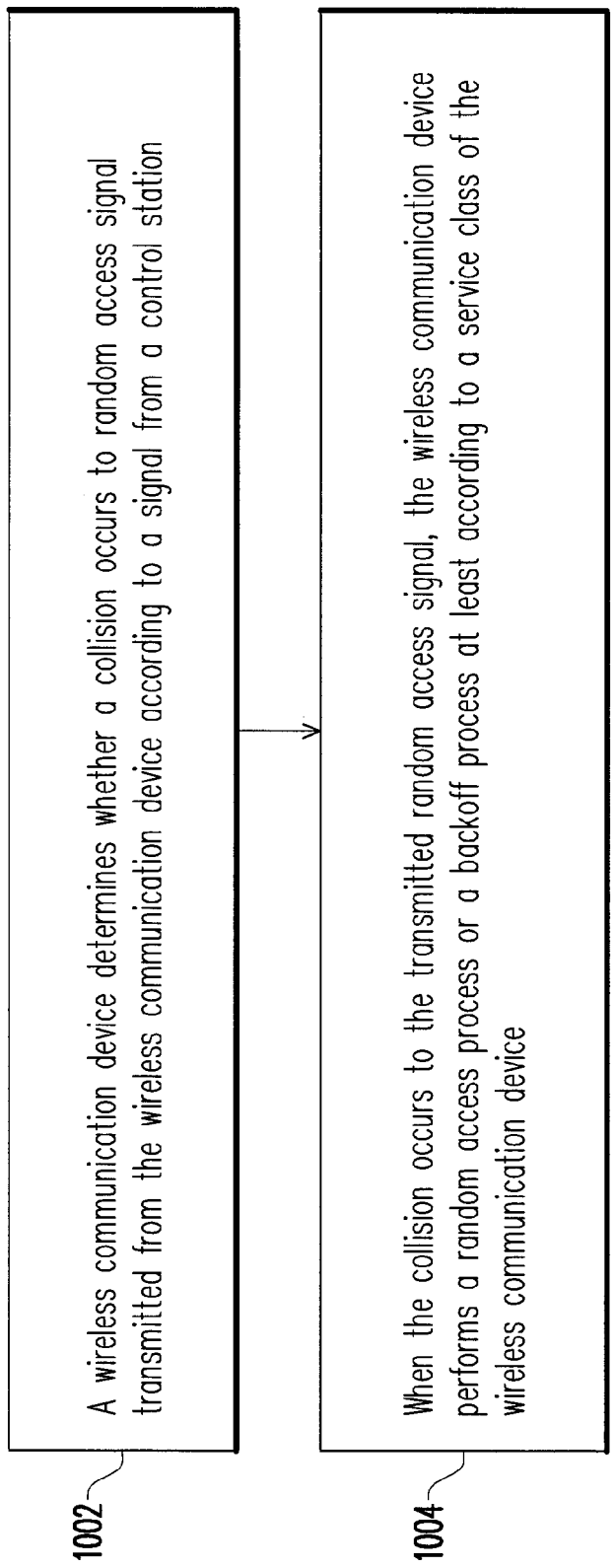
FIG. 10 is a flowchart illustrating a prioritized random access method according to an exemplary embodiment.

FIG. 10 is a flowchart illustrating a prioritized random access method according to an exemplary embodiment. The prioritized random access method illustrated in FIG. 10 summarizes technical disclosures of FIG. 2-FIG. 5 and FIG. 7A-FIG. 7C, which starts from a step S1002. In the step S1002, a wireless communication device determines whether a collision occurs to random access signal previously transmitted from the wireless communication device according to a signal from a control station. In step S1004, when the collision occurs to the transmitted random access signal, the wireless communication device performs a random access process or a backoff process at least according to a service class of the wireless communication device. In the present embodiment, the signal from the control station in the step S1002 can be the BI message illustrated in FIG. 2, FIG. 3, the indicator illustrated in FIG. 4, or the parameter set (of the BI messages) illustrated in FIG. 5.

Figure 11:
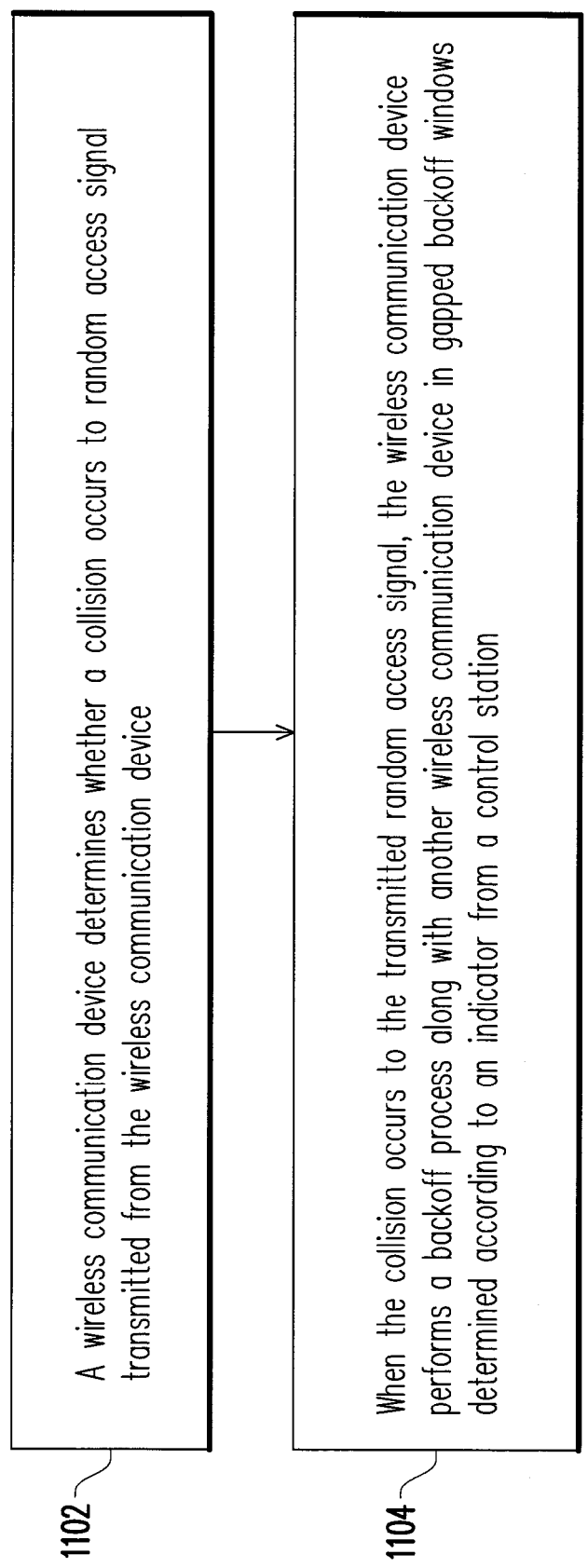
FIG. 11 is a flowchart illustrating another prioritized random access method according to an exemplary embodiment.

FIG. 11 is a flowchart illustrating another prioritized random access method according to an exemplary embodiment. The prioritized random access method illustrated in FIG. 11 summarizes technical disclosures of FIG. 2-FIG. 5 and FIG. 7A-FIG. 7C, which starts from a step S1102. In the step S1102, a wireless communication device determines whether a collision occurs to random access signal previously transmitted from the wireless communication device. In the step S1104, when the collision occurs to the transmitted random access signal, the wireless communication device performs a backoff process along with another wireless communication device in gapped backoff windows determined according to an indicator from a control station. The gapped backoff windows can be referred to embodiments illustrated in FIGS. 2-5.

The prioritized random access method, the resource allocation method, and the collision resolution method proposed in the disclosure can efficiently handle random access requests among massive and different service classes. Also, random access requests for different service requirements can be classified, and service-oriented random backoff is achieved, which provides high reliability and short delay for the emergency service class, and also differentiating high priority and low priority service classes. Further, normal UEs (or users) can still use conventional random access resource.

The overall resource utilization is not wasted due to massive and infrequent MTC service requests. Finally, the proposed methods are flexible for network deployment considering population density and emergency occurrence rate.

In summary, according to the exemplary embodiments of the disclosure, prioritized random access methods, resource allocation methods and collision resolution methods are proposed. Different priorities are assigned to connection requirements of wireless communication devices according to their respective service characteristics. Also, collision avoidance and contention resolution mechanisms are introduced for establishing connections of different service requirements such as time strict, delay tolerant, and normal user service. The resource allocation method allows different types of contention accesses have different collision opportunities and connection setup delays, meanwhile enabling dynamical adjustment in resource allocation according to practical application requirements, the number of MTC devices and system loading. Thus, resource utilization rate of the overall wireless communication network is enhanced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A prioritized random access method, comprising:
    transmitting a random access signal, from a wireless communication device, in logical resources allocated to the wireless communication device;
    determining, at the wireless communication device, whether a collision occurs to the random access signal transmitted from the wireless communication device according to a signal from a control station; and
    when the collision occurs to the transmitted random access signal, performing a random access process or a backoff process at least according to a service class of the wireless communication device,
    wherein the signal from the control station is an indicator,
    wherein the service class is classified to be in one of at least three sets of service classes, and the at least three sets of service classes comprises a first service class set, a second service class set and a third service class set,
    wherein the first service class set is allocated with a first part of the logical resources, the second service class set is allocated with a second part of the logical resources, and the first part of the logical resources is not overlapped with the second part of the logical resources,
    wherein the third service class set is allocated with a third part of the logical resources, and the third part of the resources is overlapped with the first part of the logical resources or the second part of the logical resources,
    wherein the second service class set comprises at least a first priority service class and a second priority service class, and the logical resources which are allocated to the first priority service class are overlapped with the logical resources which are allocated to the second priority service class,
    wherein the logical resources which are allocated to the first priority service class are more than the logical resources which are allocated to the second priority service class,
    wherein the first priority service class has a higher priority than the second priority service class, and
    wherein the prioritized random access method further comprises:
    when receiving the indicator from the control station, performing the backoff process based on the indicator; and
    when no indicator is received from the control station, performing the random access process by re-transmitting the random access signal in the logical resources which are allocated to the service class of the wireless communication device.

2. The prioritized random access method according to claim 1, further comprising:
    receiving, at the wireless communication device, random access configuration from the control station; wherein the random access configuration indicates the service class of the wireless communication device being prioritized along with service classes of other wireless communication devices in advance.

3. The prioritized random access method according to claim 2, wherein after the step of receiving the random access configuration, the method further comprises:
    transmitting, at the wireless communication device, the random access signal to the control station according to the random access configuration and the service class thereof.

4. The prioritized random access method according to claim 2, further comprising:
    receiving, at the wireless communication device, resource allocation from the control station, wherein the resource allocation indicates resources preconfigured for random access requests.

5. The prioritized random access method according to claim 2, wherein when the collision occurs to the transmitted random access signal, the prioritized random access method further comprises:
    retrying, at the wireless communication device, the random access processes along with another wireless communication device, in different resource determined according to the indicator.

6. The prioritized random access method according to claim 1, wherein when the wireless communication device receives the signal, the wireless communication device determines that the collision occurs to the transmitted random access signal.

7. The prioritized random access method according to claim 1, wherein the first service class set comprises at least a first service class and a second service class, wherein the first service class has highest priority over all other service classes, and the first part of the logical resources is shared by the first service class and the second service class.

8. The prioritized random access method according to claim 1, wherein when the set of service classes is preconfigured with all resources dedicated for random access requests, the prioritized random access method further comprises:
    when no indicator is received from the control station, performing the backoff process based on a configured parameter in a random access configuration.

9. The prioritized random access method according to claim 1, further comprising:
    when the indicator is received from the control station, further determining whether the collision occurs in a scheduled resource;
    when no collision occurs in the scheduled resource, retrying the random access process with an indicated parameter in the indicator; and
    when collision occurs in the scheduled resource, retrying the random access process in an indicated resource according to the indicator.

10. The prioritized random access method according to claim 9, wherein when the collision occurs to the transmitted random access signal, the prioritized random access method further comprises
performing, at the wireless communication device, the backoff process along with another wireless communication device, in gapped backoff windows determined according to the indicator.

11. The prioritized random access method according to claim 10, wherein:
the gapped backoff windows comprises a first backoff window indicated by a first parameter in the indicator, and a second backoff window indicated by a second parameter in the indicator; and
the wireless communication devices respectively perform the backoff processes in the first and second backoff windows.

12. A prioritized random access method, comprising:
transmitting a random access signal, from a wireless communication device, in logical resources allocated to the wireless communication device;
determining, at the wireless communication device, whether a collision occurs to the random access signal transmitted from the wireless communication device; and
when the collision occurs to the transmitted random access signal, performing a backoff process at least according to a service class of the wireless communication device and along with another wireless communication device in gapped backoff windows determined according to an indicator from a control station,
wherein the service class of the wireless communication device is classified to be in one of at least three sets of service classes, and the set of service classes comprises a first service class set, a second service class set and a third service class set,
wherein the first service class set is allocated with a first part of logical resources, the second service class set is allocated with a second part of the logical resources, and the first part of the logical resources is not overlapped with the second part of the logical resources,
wherein the third service class set is allocated with a third part of the logical resources, and the third part of the resources is overlapped with the first part of the logical resources or the second part of the logical resources,
wherein the second service class set comprises at least a first priority service class and a second priority service class, and the logical resources which are allocated to the first priority service class are overlapped with the logical resources which are allocated to the second priority service class,
wherein the logical resources which are allocated to the first priority service class are more than the logical resources which are allocated to the second priority service class,
wherein the first priority service class has a higher priority than the second priority service class, and
wherein the prioritized random access method further comprises:
determining whether receiving the indicator from the control station after the determination of the collision; and
when receiving the indicator from the control station, performing the backoff process based on the indicator; and
when no indicator is received from the control station, performing a random access process by re-transmitting the random access signal in the logical resources which are allocated to the service class of the wireless communication device.

13. The prioritized random access method according to claim 12, wherein the gapped backoff windows comprise a first backoff window indicated by a first parameter in the indicator, and a second backoff window indicated by a second parameter in the indicator; and the wireless communication device performs the backoff process in one of the gapped backoff windows.

14. The prioritized random access method according to claim 12, wherein the first service class set comprises at least a first service class and a second service class, wherein the first service class has highest priority over all other service classes, and the first part of the logical resources is shared by the first service class and the second service class.

15. The prioritized random access method according to claim 12, further comprising:
receiving, at the wireless communication device, random access configuration from the control station; wherein the random access configuration indicates the service class of the wireless communication device being prioritized along with service classes of other wireless communication devices in advance.

16. The prioritized random access method according to claim 15, wherein when the service class is classified to be in one set of the service classes, which are preconfigured with all resources dedicated for random access requests, the prioritized random access method further comprises:
determining whether receiving the indicator from the control station after the determination of the collision; and
when no indicator is received from the control station, performing the backoff process based on a configured parameter in the random access configuration.

17. The prioritized random access method according to claim 12, further comprising:
when the indicator is received from the control station, determining whether collision occurs in a scheduled resource;
when no collision occurs in the scheduled resource, retrying a random access process with an indicated parameter in the indicator; and
when collision occurs in the scheduled resource, retrying the random access process in an indicated resource according to the indicator.

18. The prioritized random access method according to claim 12, wherein when the collision occurs to the transmitted random access signal, the prioritized random access method further comprises:
retrying, at the wireless communication device, the random access processes along with another wireless communication device, in different resources determined according to the indicator.

19. A resource allocation method, adapted to a control station, comprising:
arranging resource allocation for a random access process;
broadcasting information of the arranged resource allocation for the random access process;
determining whether receiving a random access signal, from wireless communication devices, in logical resources allocated to the wireless communication devices;
determining whether collision occurs in the arranged resource allocation for the random access process when the random access signal is received; and
when the collision occurs in the arranged resource allocation for the random access process, transmitting an indicator to the wireless communication devices to perform backoff processes according to service classes of the wireless communication devices, whose transmitted random access signals result in the collision, wherein at least one of the service classes of the wireless communication devices is classified to be in one of at least three sets of service classes, and the set of service classes comprises a first service class set, a second service class set and a third service class set, wherein the first service class set is allocated with a first part of logical resources, the second service class set is allocated with a second part of the logical resources, and the first part of the logical resources is not overlapped with the second part of the logical resources, wherein the third service class set is allocated with a third part of the logical resources, and the third part of the resources is overlapped with the first part of the logical resources or the second part of the logical resources, wherein the second service class set comprises at least a first priority service class and a second priority service class, and the logical resources which are allocated to the first priority service class are overlapped with the logical resources which are allocated to the second priority service class, wherein the logical resources which are allocated to the first priority service class are more than the logical resources which are allocated to the second priority service class, wherein the first priority service class has a higher priority than the second priority service class, and wherein the resource allocation method further comprises:
when no collision occurs in the arranged resource allocation for the random access process, handling random access request according to the service classes thereof.

20. The resource allocation method according to claim 19, wherein the step of transmitting an indicator according to the service classes of wireless communication devices comprises:
transmitting the indicator for directing multiple sets of random access resource allocated for at least two out the three sets of the service classes.

21. The resource allocation method according to claim 20, wherein the at least two sets of service classes comprises at least a strict delay service class and a normal user service class.

22. The resource allocation method according to claim 20, wherein the at least two sets of service classes comprises at least a delay tolerant service class and a normal user service class.

23. A collision resolution method, adapted to a control station, comprising:

determining whether collision occurs to a configured random access resource; and transmitting an indicator for differentiating backoff processes of wireless communication devices when the collision occurs to the configured random access resource, wherein the step of transmitting the indicator for differentiating the backoff processes of the wireless communication devices comprises:

performing, at one wireless communication device, a backoff process according to the indicator in a first region of the configured random access resource different from a second region of the configured random access resource, at which a previous random access process of the wireless communication device is performed, wherein the wireless communication device performs the backoff process in the different region of the configured random access resource is based on a service class of the wireless communication device, wherein the service class is classified to be in one of at least three sets of service classes, and the set of service classes comprises a first service class set, a second service class set and a third service class set, wherein the first service class set is allocated with a first part of logical resources corresponding to the first region, the second service class set is allocated with a second part of the logical resources corresponding to the second region, and the first part of the logical resources is not overlapped with the second part of the logical resources, wherein the third service class set is allocated with a third part of the logical resources, and the third part of the resources is overlapped with the first part of the logical resources or the second part of the logical resources.

24. The collision resolution method according to claim 23, wherein the step of transmitting the indicator for differentiating the backoff processes of the wireless communication devices comprises:
indicating, in the indicator, different preconfigured random access resources at which the wireless communication devices perform backoff processes.

25. The collision resolution method according to claim 24, wherein the step of transmitting the indicator for differentiating the backoff processes of the wireless communication devices comprises: indicating, in the indicator, different offset windows at which the wireless communication devices perform backoff processes.

26. The collision resolution method according to claim 25, wherein the service class of the wireless communication device is a normal user service class.

* * * * *